Patented June 20, 1939

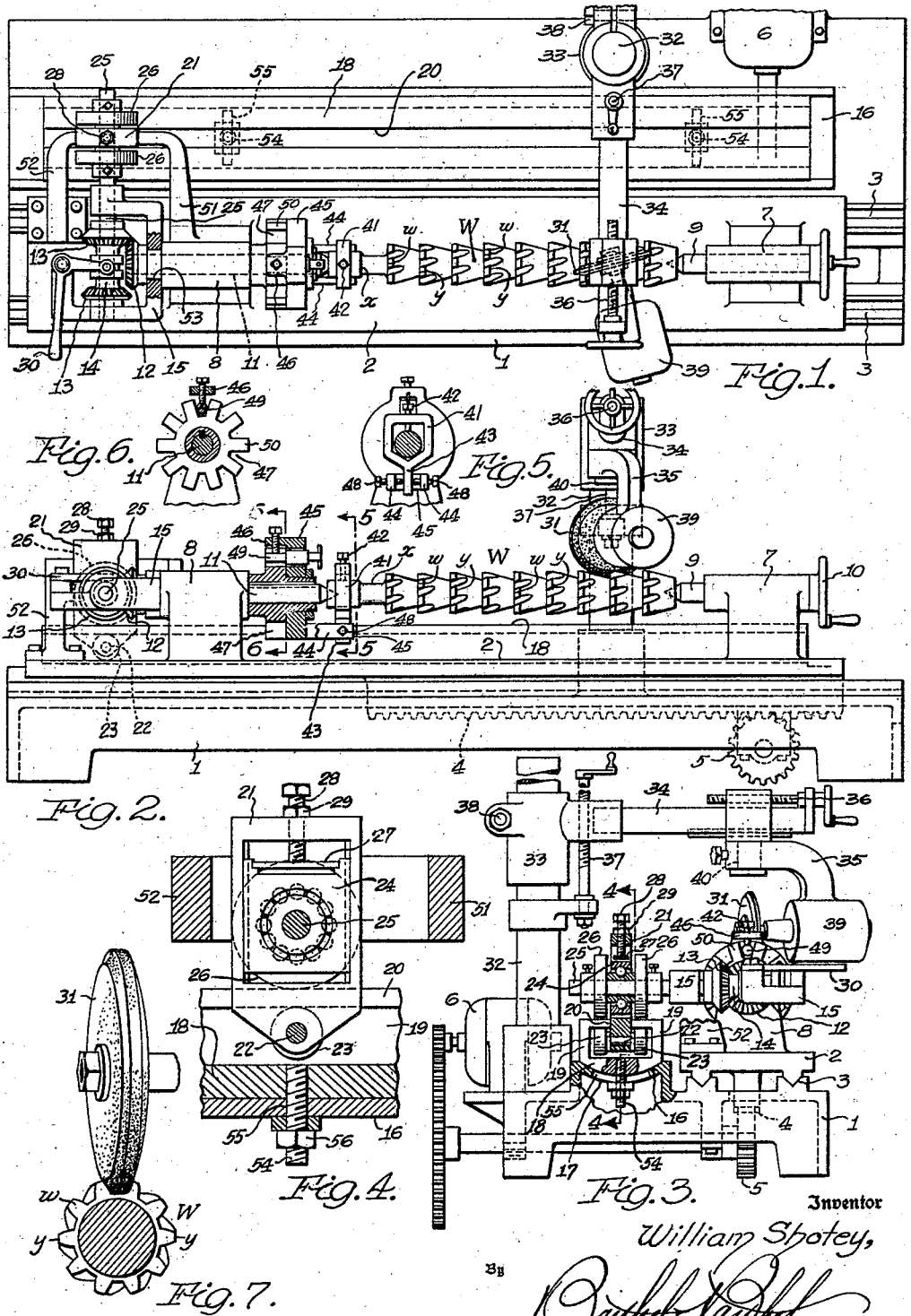

2,162,758

UNITED STATES PATENT OFFICE 2,162,758

SPIRAL GRINDING MACHINE

William Shotey, Belleville, Mich.

Application August 6, 1937, Serial No. 157,771

7 Claims. (Cl. 51—95)

This invention relates to a machine for spiral forming or grinding and more particularly for the accurate finishing of the tooth or other spiral surface of a blank.

An object of the present invention is to insure accuracy of spiral pitch, facilitate adjustment to change the pitch, and to eliminate the necessity for complicated gearing to impart to the work accurately proportioned simultaneous rotative and reciprocative movements necessary in the forming of a spiral with the desired pitch.

It is also an object to provide means for accurately proportioning rotations of the work to reciprocations thereof, which means is such as to facilitate change of pitch and eliminate inaccuracies in the spiral formation.

A further object is to provide a machine of simple construction especially adapted to grind the spirally arranged teeth of a broach or other device and provided with adjusting means for effecting changes of pitch of the spiral and to adapt the machine to other forms of work and to the forming of either a left or right hand spiral.

A further object is to provide certain other new and useful features in the construction, arrangement and combination of parts, all as hereinafter more fully set forth, reference being had to the accompanying drawing, in which Figure 1 is a plan view of a machine illustrative of an embodiment of the present invention;

Fig. 2 is a side elevation of the machine with parts in section to more clearly show the construction;

Fig. 3 is an enlarged end elevation of Figs. 1 and 2 with parts in section to disclose the construction;

Fig. 4 is an enlarged sectional detail substantially upon the line 4—4 of Fig. 3;

Fig. 5 is a sectional detail substantially upon the line 5—5 of Fig. 2;

Fig. 6 is a sectional detail substantially upon the line 6—6 of Fig. 2, and

Fig. 7 is a perspective view of a grinding wheel in grinding position in connection with a toothed broach.

In machines as commonly constructed for spiral grinding, the work is rotated in proportion to the longitudinal movement of the work by more or less complicated gearing which because of the necessary play or clearance and the wearing of the gear teeth, is inaccurate in producing the exact desired pitch of the spiral. In the present machine such gearing is dispensed with and means provided which is accurate in its functioning and not liable to get out of order.

As shown in the accompanying drawing, the machine comprises a supporting frame or bed 1 on which is mounted a work carrying table 2 adapted to be reciprocated longitudinally along ways 3 provided upon the supporting frame, said carriage 2 being reciprocated by means of a rack 4 on the carriage engaged by a pinion 5 on the shaft of an electric motor 6 supported upon the frame in any suitable manner. Rising from the carriage 2 are the usual head stock 7 and tail stock 8, the head stock being provided with the usual spindle 9 which is moved longitudinally by means of a hand wheel 10 to engage the pointed end of the spindle 9 with the end of the work and form a center therefor on which it may rotate. The tail stock is also provided with a centering spindle 11 having a pointed end to engage the opposite end of the work and center the same and this spindle 11 is provided with a bevelled gear 12 on its outer end to be engaged by a pair of like bevelled gears 13 mounted upon a sleeve 14 extending transversely of the sipndle 11, this sleeve 14 being splined upon a drive shaft which in turn is mounted within bearings carried by the arms of a yoke 15 supported by the tail stock 8.

Extending parallel with the carriage 2 at one side thereof and of a length substantially equal to the length of the carriage, is a longitudinal seat 16 formed integral with the bed or frame 1 and provided with a transversely curved upper wall 17 forming a trough-like seat for a guide frame 18 formed with side members or walls 19 forming a track extending the full length of the frame 18 and each projecting inwardly at its upper side to form between them a longitudinal slot 20 into which a bracket indicated as a whole by the numeral 21 extends. Mounted upon the lower end of this bracket by means of a transverse pin 22, is a pair of rolls 23, which rolls are adapted to engage at their upper sides, the lower surfaces of the inwardly projecting flanges formed by the walls 19, to roll along the track provided thereby with the bracket 21 projecting through the slot 20. The bracket 21 is in the form of a journal box and within this journal box is mounted a head or block 24 having a roller bearing for a drive shaft 25 which extends transversely of the box or bracket 21 through the bearing in said block and also of the guide frame or track 18.

Secured upon this shaft 25 at each side of the bracket or box 21, is a wheel 26, said wheels being adapted to travel upon the upper surface of the guide frame or track 18 at each side of the slot 20, in opposed relation to the rolls 23, and to hold the rolls and wheels in firm contact with the upper and lower surfaces of the side flanges or walls 19 of the track frame 18, the block 24 is made adjustable within the bracket 21, said bracket being formed with internal guide ribs for the block, and extending across a cut-away portion of the upper end of the block is a heavy flat spring 27 which bears at its ends upon seats on the block and is engaged intermediate its ends by means of an adjusting screw 28 passing through a screwthreaded opening in the upper end of the bracket 21 and this screw is provided with a lock nut 29. Therefore by turning the screw 28, force is applied to the spring 27 to move the head 24 downwardly and thus move the shaft 25 and wheels 26 toward their track 18, at the same time exerting a force in an upward direction upon the bracket 21 to move the rolls 23 into firm engagement with the lower sides of the inwardly extending flanges 19 of the track. Therefore the rolls 23 and wheels 26 are yieldingly and firmly held in contact with the opposite faces of the flanges of the frame or track 18 along the guide slot 20 thereof for the bracket 21.

The shaft 25 forms a drive shaft upon which is splined the sleeve 14 carrying the bevelled gears 13 to be brought, one at a time, into engagement with the gear 12 on the spindle 11, by sliding said sleeve along the shaft by means of a hand lever 30; said shaft being mounted in bearings on the ends of the arms of the yoke 15. Therefore when the work table or carriage 2 is moved longitudinally by power applied by means of the motor 6, the shaft 25 will be carried along by the carriage and the wheels 26 will roll along the track frame 18, imparting rotation to said shaft 25 and this rotation will be imparted to the spindle 11 by means of the bevelled gears 12 and 13. Therefore rotation of the spindle 11 will be in direct proportion to the travel of the wheels 26 along the guide frame or track 18, that is, rotation of said wheels caused by their contact with said track as they are moved therealong by movement of the carriage 2, will impart a proportionate rotation to said spindle, the proportionate relation of rotation of wheels and spindle depending upon the diameter of said wheels and determining the pitch of the spiral, the direction of rotation of the spindle depending upon which of the gears 13 is engaged with the gear 12 and this determining the forming of a left or right hand spiral by the mere shifting of the sleeve 14.

As illustrative of one use to which the present machine may be put, the work W is shown in the accompanying drawing as a broach for broaching a bore of a member to form internal spiral teeth therein, said broach comprising a series of annular ribs or heads w, the periphery of each of which is formed with a plurality of spirally-extending teeth y, each series of teeth upon the series or ribs, extending in a spiral path in the direction of the length of the broach and the broach being formed with the usual shank portion x at one end, the work being usually in the form of a blank with the teeth blanked out in their spiral relation, the present machine being employed to grind the side surfaces and the bottoms of the teeth to the proper contour and smoothness. For this purpose a circular grinding wheel 31 having a peripheral edge portion properly shaped, is suspended above the work by providing a fixed vertical post 32 extending upwardly from the bed 1 and provided with a sleeve 33 having a rigid horizontally extending arm 34 upon which arm a bracket 35 is mounted, said bracket being adjustable longitudinally of the arm 34 by means of an adjusting screw 36, and the sleeve 33 being adjustable longitudinally of the post 32 by means of an adjusting screw 37, the sleeve 33 and arm 34 being held rigidly in adjusted position by means of a clamping bolt 38 for contracting the sleeve upon the post. The bracket 35 is adapted for the support of an electric motor 39 the shaft of which extends horizontally and to the end of this shaft is secured the grinding wheel 31. The bracket 35 is also pivotally attached to the supporting arm 34 by means of a pivot 40 so that the bracket may be swung to any position about the vertical axis of the pivot and therefore the grinding wheel may be positioned at the desired angle to the longitudinal axis of the work or broach, said angle corresponding to the pitch of the spiral path defined by the longitudinal travel of the work and rotation thereof relative to the grinding wheel. One end of the broach is centered by means of the spindle 9 and the opposite end or shank of the broach is supported and centered by means of the spindle 11.

In order to rotate the work with the rotation of the spindle 11, a driving dog indicated as a whole by the numeral 41, is provided, this driving dog as shown in Fig. 5, being in the form of a loop to receive the shank of the broach which shank is held stationary therein by means of a set screw 42, and this loop or yoke 41 has a downwardly extending arm 43 which is interposed between arms 44 projecting laterally from a disc 45 having a lug 46 extending in an opposite direction from the disc and projecting over an index wheel 47 which is splined upon the spindle 11. The arms 44 carry set screws 48 for engaging opposite sides of the arm 43 and the disc 45 has a retractible pin 49 extending through an opening in the disc and adapted to engage within any one of the spaces between the arms 50 of the index wheel 47.

When the grinding wheel 31 traverses a spiral path indicated by the spiral positions of one row of the teeth of the broach, the broach will be so held relative to the grinding wheel by the adjustment of the set screws 48, that the grinding wheel will engage and grind one side surface of each tooth as the work or broach is moved longitudinally in one direction past the grinding wheel and then by adjustment of these same set screws 48, the grinding wheel will be caused to contact and grind the opposed side surface of the adjacent teeth of the row upon return reciprocation of the broach past the grinding wheel.

To grind the side surfaces of the next row of notches, the broach is indexed around the distance of one tooth, by withdrawing the pin 49 from engagement between the arms 50 of the index wheel and then turning the disc 45 and consequently the broach to enter the pin 49 within the next space between the arms of the index wheel.

Adjustments are therefore provided for accurately adjusting the grinding wheel toward and from the work and also to its angular relation to the longitudinal axis of the work, and also the adjustment or indexing around of the work is provided for.

Provision is also made for changing the pitch of the spiral path of relative travel of work and grinding wheel to change the pitch of the teeth formed thereby and this adjustment is accomplished by removing the wheels 26 from their shaft 25 and substituting wheels of a lesser or greater diameter depending on whether it is desired to give to the spiral a lesser or greater pitch, as the smaller the wheels are in diameter the greater the number of rotations thereof where will be be in a given length of travel of these wheels along their track 18 and the work will be rotated a proportionately greater distance in proportion to the longitudinal travel of the work which is provided by the longitudinal travel of the carriage 2.

As the carriage 2 moves longitudinally, it carries with it the wheels 26 which roll in contact with the track 18 and are held in such firm contact by means of the adjusting screw 28 which is adjusted to maintain the rolls 23 in contact with one side of the track 18 and to yieldingly hold the wheels in contact with the opposite or upper surface of said track so that there will be no slippage of the wheels in rolling along the track, and the bracket 21 which carries the bearings for these rolls and wheels, is guided and held in an upright position as it moves along the slot 20 of the track 18, by means of suitable rigid arms 51 and 52, the arm 51 extending laterally from the tail stock 8 with its end in abutting relation to one side of the bracket frame 21, and the arm 52 being rigidly attached to the carriage 2 and extending laterally with its end abutting the opposite side of said bracket. This bracket frame is therefore guided between the ends of these rigid arms which take the twisting or other strain which might be applied to the bracket in its movement with the carriage along the slot 20.

It will be noted, however, that when the wheels 26 are removed and others of larger or smaller diameter substituted therefor, that the shaft 25 upon which these wheels are mounted will be changed in its angular position by reason of the larger or smaller diameter of the wheels running upon the track, the shaft 25 being free to swing about the axis of the spindle 11 due to the fact that said shaft 25 is mounted in bearings upon the ends of the arms of the yoke 15 which is pivotally mounted as at 53. As the wheels 26 are mounted directly upon the shaft 25, should said shaft be tilted longitudinally as described, by changing the wheels 26 for others of a larger or smaller diameter, these wheels must still squarely contact the upper surface of the track 18 so that there will be no slippage of the wheels in contact with the track, and as the frame 21 provides a journal bearing for this shaft, said frame must remain at right angles to the axis of the shaft and travel in that position along the slot 20. This frame 21 is therefore not made a part of the arms 51 and 52 but is simply guided between these arms and may therefore tilt therebetween, with the tilting of the shaft. Also in order to maintain proper contact between the wheels and the track upon adjustment by change of wheels, the upper surface of the track must be maintained parallel with the axis of the shaft 25 so that the wheels will squarely engage such surface, and therefore, the track frame 18 as a whole is made laterally adjustable to an angular position by providing the longitudinal seat 16 therefor which seat is curved transversely, and the lower side of the track frame is also curved transversely to seat within said seat and by reason of such transverse curvature the track frame may be tilted laterally within its seat so that its surfaces contacted by said rolls and wheels will be parallel with the axis of the shaft 25 when said shaft is tilted longitudinally by reason of the changing of the wheels 26, and to secure said track frame in such adjusted position, screw bolts 54 are provided upon the bottom of said frame and project downwardly through transverse slots 55 in the curved bottom wall 17 of the seat, nuts 56 on the lower ends of said bolts being provided to secure said frame in firm seating contact with said seat.

With this arrangement a change in the pitch of the spiral may be quickly effected, as the means for rotating the work in direct proportion to its longitudinal travel includes the wheels which are caused to rotate by their travel in contact with the longitudinal track, and defects in the pitch are effectually eliminated as these wheels are not liable to wear or get out of proper alinement or cease to function properly.

Obviously changes may be made in the construction and arrangement of parts without departing from the spirit of the invention and I do not, therefore, limit myself to the particular construction shown.

Having thus fully described my invention what I claim is:

1. A machine for the purpose described including a work carrying carriage provided with means for rotatively supporting work with the longitudinal axis of the work extending longitudinally of the carriage, a grinding member to engage the work, a track extending longitudinally of the carriage, means on the carriage for rotating the work and including a rotative member to travel along the track and impart rotation to the work during travel of the carriage, said member for travel along the track being detachable to be replaced by a member of a different diameter to change the proportion of rotation of said member and work to the length of longitudinal travel of the work, and means for yieldingly holding said rotative member in contact with said track during movement of the carriage relative to the track.

2. A machine for the purpose described, including a longitudinally movable carriage, means on said carriage for centering the work, means for rotating the work including a drive shaft, a track extending longitudinally of the carriage, a rotatable member detachably secured to said shaft to travel along said track and by its engagement with said track be rotated during longitudinal movement of the carriage, said rotatable member being adapted to be detached from said shaft and replaced by a member of a different diameter for changing the rotation of the shaft and consequent rotation of the work relative to the longitudinal movement of said carriage and work, said shaft being supported for swinging movement to provide for a change of said member for movement along said track, and means providing a bearing for said shaft adjacent said rotatable member thereon and adapted to travel along said track and be guided thereby.

3. A machine for the purpose described including a supporting frame, a longitudinally reciprocable carriage mounted upon said frame, centering and supporting means for work mounted upon said carriage and including a rotatable spindle, a grinding member for engaging and operating upon the work during longitudinal movement of the carriage, and means for imparting rotation to said spindle and work during longitudinal movement of the carriage and work, said means including a drive shaft extending transversely of the axis of said spindle, means for transmitting motion from said drive shaft to said spindle, means for supporting said drive shaft and permitting rotative movement of said supporting means and drive shaft about the axis of said spindle, a wheel detachably secured to said drive shaft, a track extending longitudinally of said carriage and upon which said wheel is adapted to travel during longitudinal movement of said carriage, said wheel being adapted to be detached from said shaft and replaced by one of a different diameter to change rotation of said shaft relative to the length of travel of the wheel along the track, bearing means for said shaft adjacent said wheel and adapted to travel along said track with said wheel to support and guide the wheel in its movement along the track, and means for holding said wheel in frictional contact with said track during the travel of said wheel along the track.

4. A machine as characterized in claim 3, and including means forming a seat for said track, and means for holding said track seated in said seat and for permitting adjustment of said track within its seat laterally of the track.

5. A machine as characterized in claim 3, and including a seat for said track, said seat being curved transversely and said track being curved transversely at its lower side to seat in said seat, and means for adjustably holding said track seated upon said seat in adjusted position.

6. A machine for the purpose described including a supporting frame, a carriage reciprocable longitudinally upon said frame, means for reciprocating said carriage, work centering and rotating means mounted upon said carriage and including a spindle for rotating the work, a grinding member adjustably mounted upon said frame in position to engage and grind the work during longitudinal movement of the carriage, a bearing yoke supported for limited rotation about the longitudinal axis of said spindle, a drive shaft mounted in bearings in the ends of the arms of said yoke with said shaft extending transversely of the axis of said spindle, means for transmitting rotative motion from said shaft to said spindle, a guide track on said supporting frame extending longitudinally of and parallel with said carriage, said track having side flanges spaced apart at their adjacent edges to form a longitudinal slot with said flanges forming a track, wheel detachably mounted upon said shaft to travel upon the upper surfaces of said flanges of said track, a bearing bracket for said shaft guided within said slot of said track, rolls mounted upon the lower end portion of said bearing bracket to engage beneath said flanges of said track, means for yieldingly holding said rolls and wheels in frictional contact with said flanges of said track, and rigid arms extending laterally from said carriage and engaging said bearing bracket to guide the same as it is moved by longitudinal movement of the carriage along said track within said slot thereof.

7. In a machine for spirally grinding work, a grinding means, a movable carriage for supporting work and moving said work longitudinally in contact with said grinding means to be ground thereby, a member for rotatably driving said work and extending substantially at right angles to the longitudinal axis of said work, a stationary rigidly supported track extending parallel with said work and at the side thereof, and a circular member secured to said driving member and in rolling engagement with said track for imparting to said driving member a rotatable movement for driving said work rotatably as said circular member is rolled along said track, the contact between said circular member and said track being adapted for preventing slippage between said members during the rolling action of said circular member on said track.

WILLIAM SHOTEY.